United States Patent [19]
Brown

[11] Patent Number: 5,740,361
[45] Date of Patent: Apr. 14, 1998

[54] SYSTEM FOR REMOTE PASS-PHRASE AUTHENTICATION

[75] Inventor: Gary S. Brown, Columbus, Ohio

[73] Assignee: CompuServe Incorporated, Columbus, Ohio

[21] Appl. No.: 656,936

[22] Filed: Jun. 3, 1996

[51] Int. Cl.[6] ................................................. G06F 12/14
[52] U.S. Cl. ............................................... 395/187.01
[58] Field of Search .................... 364/DIG. 1 MS File, 364/DIG. 2 MS File; 380/4, 21, 23, 46, 49; 395/601, 609, 761, 762, 186, 187.01, 188.01, 200.3, 200.33

[56] References Cited

U.S. PATENT DOCUMENTS

| | | | |
|---|---|---|---|
| 5,535,276 | 7/1996 | Ganesan | 380/25 |
| 5,550,984 | 8/1996 | Gelb | 395/200.75 |
| 5,604,803 | 2/1997 | Aziz | 380/25 |
| 5,638,448 | 6/1997 | Nguyen | 380/29 |

OTHER PUBLICATIONS

Dave Raggett, Internet Draft, *Mediated Digest Authentication*, Mar. 1995, pp. 1–12.

Bird, et al., *A Modular Family of Secure Protocols for Authentication and Key Distribution*, Nov. 1992, pp. 1–15.

Bird, et al., *Systematic Design of a Family of Attack-Resistant Authentication Protocols*, Sep. 1992, pp. 1–26.

Molva, et al., *KryptoKnight Authentication and Key Distribution System*, 20 pages.

*Primary Examiner*—Robert B. Harrell
*Attorney, Agent, or Firm*—Standley & Gilcrest

[57] ABSTRACT

A system and method are disclosed for authenticating users and services communicating over an insecure network. Each user and service has a pass-phrase used for authentication. However, the pass-phrases are not revealed during the authentication process as challenge-response techniques are used to keep the pass-phrase secret. In addition, the users and services do not need to know nor do they learn each other's pass-phrases making the process useful in a distributed environment. Pass-phrases are known by an authentication entity with which the service communicates to authenticate both users and services. Users may have identities in and services may support a number of realms, each of which may be viewed as large collection of users (e.g., CompuServe.com). Users choose the realm in which they would like to be authenticated. In one embodiment of the present invention, the system and method are adapted for use with the HyperText Transfer Protocol of the World Wide Web so that secure transactions may be accomplished between users and services communicating via the Internet.

26 Claims, 3 Drawing Sheets

SYSTEM FOR REMOTE PASS-PHRASE AUTHENTICATION

BACKGROUND OF THE INVENTION

1. Field of the Invention

The present invention relates to authentication of computer users and services in distributed environments. Particularly, the present invention relates to a Remote Pass-phrase Authentication scheme that provides a way to authenticate users and services using a pass-phrase over a computer network without revealing the pass-phrase.

2. Description of the Related Art

The importance of secure communication is increasing as world-wide networks such as the Interact and the World Wide Web (WWW) portion of the Internet expand. As global networks expand through the interconnection of existing networks, users may gain access to an unprecedented amber of services. The services, each of which may be maintained by a different provider, give users access to academic, business, consumer, government, etc. information. Service providers are now able to make their services available to an ever-expanding user base.

The ease with which services and users are able to find each other and the convenience associated with on-line transactions is leading to an increase in the number of remote business and related transactions. However, users and services are not always certain who or what is at the other end of a transaction. Therefore, before they engage in business and other transactions, users and services want and need reassurance that each entity with whom they communicate is who or what it purports to be. For example, users will not be willing to make on-line purchases that require them to reveal their credit card numbers unless they are confident that the service with which they are communicating is in fact the service they wanted to access. Commercial and other private entities who provide on-line services may be more reluctant than individuals to conduct business on-line unless they are confident the communication is with the desired individual or service.

Both users and services need reassurance that neither will compromise the integrity of the other nor that confidential information will be revealed unintentionally to third parties while communications are occurring. Security in a global network, however, may be difficult to achieve for several reasons. First, the connections between remote users and services are dynamic. With the use of portable devices, users may change their remote physical locations frequently. The individual networks that comprise the global networks have many entry and exit points. Also, packet switching techniques used in global networks result in numerous dynamic paths that are established between participating entities in order to achieve reliable communication between two parties. Finally, communication is often accomplished via inherently insecure facilities such as the public telephone network and many private communication facilities. Secure communication is difficult to achieve in such distributed environments because security breaches may occur at the remote user's site, at the service computer site, or along the communication link. Consequently, reliable two-way authentication of users and the services is essential for achieving security in a distributed environment.

Two-way authentication schemes generally involve handshaking techniques so that each party may verify he or she is in communication with the desired party regardless of each party's location or the types of devices in use. The problem to be solved is one in which a user communicates with a service that wishes to learn and authenticate the user's identity and vice versa. To clarify the problem, there are three aspects of network security that may be distinguished:

| | |
|---|---|
| Identification: | the way in which a user or service is referenced. |
| Authentication: | the way in which a user may prove his or her identity. |
| Authorization: | a method for determining what a given user may do. The same aspects apply to services as well as users. |

Identification

A user's identity consists of a user name and a realm name. A realm is a universe of identities. CompuServe Information Service (CIS) user IDs and America Online (AOL) screen names are two examples of realms. The combination of user name and realm—typically shown as name@realm—identifies a user. Any given service recognizes some particular set of identities. A realm does not have to be large, though, either in number of users or size of service. For example, a single WWW server may have its own realm of users.

Often, a service recognizes only one realm: CIS recognizes only identities within the CIS realm and AOL recognizes only identities within the AOL realm. But, one can imagine a service that has agreements with both CIS and AOL. The service gives the user a choice of realms—"Please supply a CIS or AOL identity, and prove it"—and the user chooses a realm in which he or she has an identity. Identification, thus, provides the ability to identify, or to refer to, a user.

Authentication

Authentication provides the ability to prove identity. When asking to do something for which a user's identity matters, the user may be asked for his or her identity—a user name and realm—and the service requires the user to prove that he is who he says he is. To accomplish this, most services use a secret called a pass-phrase, although it is not necessarily derived from text. Such a secret is sometimes called a secret key, but it is not necessarily used for encryption. In this context, the fundamental problem to be solved is: How can a user prove his pass-phrase without revealing the pass-phrase in the process?

Authorization

Authorization refers to the process of determining whether a given user is allowed to do something. For example, may he post a message? May he use a surcharged service? It is important to realize that authentication and authorization are distinct processes—one related to proving an identity and the other related to the properties of an identity. The present invention is not related to authorization, but it is designed to co-exist with authorization mechanisms.

Pass-phrase

A service that wishes to authenticate a user requires the user to identify himself or herself and to prove that he or she knows the pass-phrase. Generally, the service prompts the user for the pass-phrase. However, transmitting the plain text pass-phrases through a network comprises security because an eavesdropper may learn the pass-phrase as it travels through the network. X.25 networks have been compromised, and LANs, modem pools, and "The Internet" likewise are not suitable for plain text pass-phrases due to the eavesdropper problem. Prompting for the pass-phrase, while sufficient in the past, no longer works for extensive world-wide networks.

Pass-phrase Encryption

Encryption of the pass-phrase provides additional security and addresses the eavesdropper problem. Using encryption, the user encrypts the pass-phrase, sends the result to the service which then decrypts it. Some techniques are based on a one-time key that prevents an eavesdropper from decrypting the pass-phrase.

There are, however, problems with this technique as well. Somebody else—a spoofer—may pretend to be the service. The spoofer decrypts the result, learns the pass-phrase, and gains the ability to masquerade as the user. Some people have spoofed services by getting users to dial into the spoofer's computer. The spooler advertises a dial up number for the service that is claimed to have been omitted from the directory of service numbers. The spoofer may entice people to try the "unlisted" number by claiming it is much faster than the listed numbers. Therefore, there is a need for a mechanism that will not reveal the pass-phrase to anyone, even if the user is interacting with a spooler.

Challenge-response Techniques

Challenge-response techniques involve a series of exchanges between a user and a service. The service sends the user a challenge, which is a random number, and the user applies a one-way function to the number to calculate a result that depends on the challenge and the user's pass-phrase. The user sends the result to the service which performs the same calculation and compares the result to the result sent by the user. Done correctly, this technique reveals no information to eavesdroppers, nor does it allow a spoofer to acquire the pass-phrase—if a spoofer pretends to be the service, he learns the result only for a particular challenge—which is of no value. Although such a technique works, it does not solve the problem completely. The service must know the pass-phrase in order to reproduce the user's calculation and verify the user's response to the service's challenge.

The service may not know the user's pass-phrase for several reasons. A set of services may share a set of users' identities. For example, a collection of Web servers, scattered throughout the world, may be part of a "Total Information Service (TIS)." A user requesting access to TIS may use her TIS user name and pass-phrase to identify herself to any TIS service. In accordance with one implementation, each physical server may have a copy of all pass-phrases or access to a master database containing all pass-phrases. This solution may not, however, work under all scenarios—especially if some are third-party servers, not directly under the control of the imaginary TIS. Or consider a service that accepts identities in multiple realms—for example, a service that has agreements with both CIS and AOL. The service gives the user a choice of realms—"Please supply a CIS or AOL identity, and prove it"—and the user chooses a realm in which he has an identity. It is unlikely that CIS and AOL will entrust a copy of their pass-phrase databases to a third-party service, or to each other. If the service does not how the user's pass-phrase, then the user cannot prove to the service that he knows it.

One technique to address this problem is to have the service prompt the user for her pass-phase. For example, a WWW service may display a Hyper-Text Markup Language (HTML) form with two boxes—one that asks for the user for her user name and one that asks her for her pass-phrase. A protocol such as SSL or SHTTP may be used so an eavesdropper cannot see it. When the service receives the user's reply, the service may use a challenge-response technique to verify the pass-phrase with a server that knows the pass-phrases. But, there is a drawback to this technique. It is important to teach a user not to type his or her pass-phrase just because somebody asks for it. This technique is commonly used for cracking others' accounts. Teaching users to provide their pass-phrases in a HTML form is not a desirable solution because the pass-phrase is revealed, which is precisely what should be avoided, especially if the service is a spoofer.

The pass-phrase database server also has some undesirable side effects. Using this scheme, the service asks the user for a copy of her pass-phase. Now, an ordinary challenge-response technique may be used. However, there is a need to get the pass-phrase from that database to the service, safely. If the service can look up the pass-phrase, then anybody else may do the same. Even worse, the entire pass-phrase database may be accessed so that pass-phrases for many users may be obtained.

Current authentication mechanisms are inadequate for the distributed systems, services, and users that comprise today's world-wide networks such as the WWW/Internet. Users and services need a way to reliably authenticate one another that also meets specific design criteria. Users and services also have a need for a mechanism that is adaptable to the many communication protocols used throughout world-wide networks and that is straightforward for users to use. These criteria and others are met with the present invention.

SUMMARY OF THE INVENTION

The present invention—Remote Passphrase Authentication (RPA)—provides a way to authenticate a user to a service by using a pass-phrase over an insecure network, without revealing the pass-phrase to eavesdroppers. RPA is designed so that the service need not know and does not learn the user's pass-phrase. Consequently, RPA is useful in distributed environments where it would be difficult or inappropriate to trust a service with a pass-phrase database or to allow the service to learn enough to masquerade as the user in a future authentication attempt. In one embodiment of the present invention, users and services on the WWW/Internet use the mechanism of the present invention to authenticate one another.

Using the present invention, a service may authenticate a user and a user may authenticate a service. Authentication is accomplished using pass-phrases (which may be derived from textual phrases). The goal is to prove to the service that the user knows the pass-phrase, and vice versa. Techniques are employed to minimize the possibility that the pass-phrase is revealed to an eavesdropper or a spoofer.

Using RPA, a "user" communicates with a "service" that wishes to learn and authenticate the user's identity. An authentication "deity" knows the users' and services' pass-phrases. The service communicates with the authentication deity during the authentication process. If the service knows the pass-phrases, then it acts as its own deity, simplifying the implementation but, otherwise having no effect on the mechanism.

Identities for users exist in a "realm" which may be viewed as a relatively large collection of users—such as compuserve.com or aol.com—but it may well consist of a small set of users (e.g., user names and pass-phrases associated with an individual Web server.) The service may specify a set of realms so that it may recognize an identity in any of the realms in which it participates.

This authentication mechanism of the present invention consists of three related processes: authentication, reauthentication, and reauthentication cheating. Authentication is the fundamental process by which a user and a service mutually authenticate one another within one of a set of realms, without revealing their pass-phrases to one another. Reauthentication is a process by which a user and service, having recently authenticated one another, may again authenticate one another. They may, of course, simply repeat the authentication process, but that requires interaction with an authentication deity. The reauthentication process is faster, requiring no communication with a third party. Reauthentication is useful when multiple connections between the user and service are established, whether sequential as in Hyper-Text Transfer Protocol (HTTP) or simultaneous. Preferably, each connection is authenticated, but the reauthentication process provides a shortcut.

Authentication

Three parties or entities participate in the authentication process:

the user;

the service; and the authentication deity.

Each user has a user name and a pass-phrase in some realm of interest. Similarly, each service has a name and a pass-phrase in that realm. The pass-phrase is not text, but is instead a 128-bit (16-octet) string of bits. However, it is often useful to use pass-phrases in the conventional, textual sense, so a procedure is defined for convening a textual phrase to the 128-bit value used by the authentication mechanism of the present invention.

The service may specify a list of realms and the user may choose one in which he has an identity. For example, a CIS user may choose to be authenticated in the CIS realm. Thus, a service is not restricted to authenticating identities in a single realm. The service possesses a name and pass-phrase in all realms it specifies.

Each realm has an authentication deity that knows the names and pass-phrases of its members. The service locates an authentication deity for each realm. If the service knows the user's pass-phrase, it performs the role of the authentication deity itself, but this does not affect the mechanism. The primary steps for a preferred embodiment of the present invention are as follows:

The service supplies a sequence of realms, with the service's name in each realm, to the user.

The user chooses a realm. The chosen realm and the user's name in that realm are communicated to the service.

The service and user exchange random challenges.

The user calculates a response and sends it to the service.

The service calculates a response.

The service sends a request to the authentication deity for the realm in question. The request contains the realm name, the user's name, the service's name, the user's challenge, the service's challenge, the user's response, and the service's response.

The deity uses the realm, service, and user name to look up the user's and service's pass-phrases.

The deity uses the values in the request, plus the service's pass-phrase to verify the service's response.

Having verified the requesting service's identity, the deity uses the values in the request, plus the user's pass-phrase to verify the user's response.

Having verified both the user's and service's identity, the deity creates a random, 128-bit session key for use by the user and service. They may use it for session encryption or for the reauthentication process described later.

The authentication deity generates and sends to the service authentication proofs for the service and the user. The service verifies its authentication proof and forwards the other authentication proof to the user. The user then verifies its authentication proof.

BRIEF DESCRIPTION OF THE DRAWING(S)

DETAILED DESCRIPTION OF THE PREFERRED EMBODIMENT(S)

Figure 1:
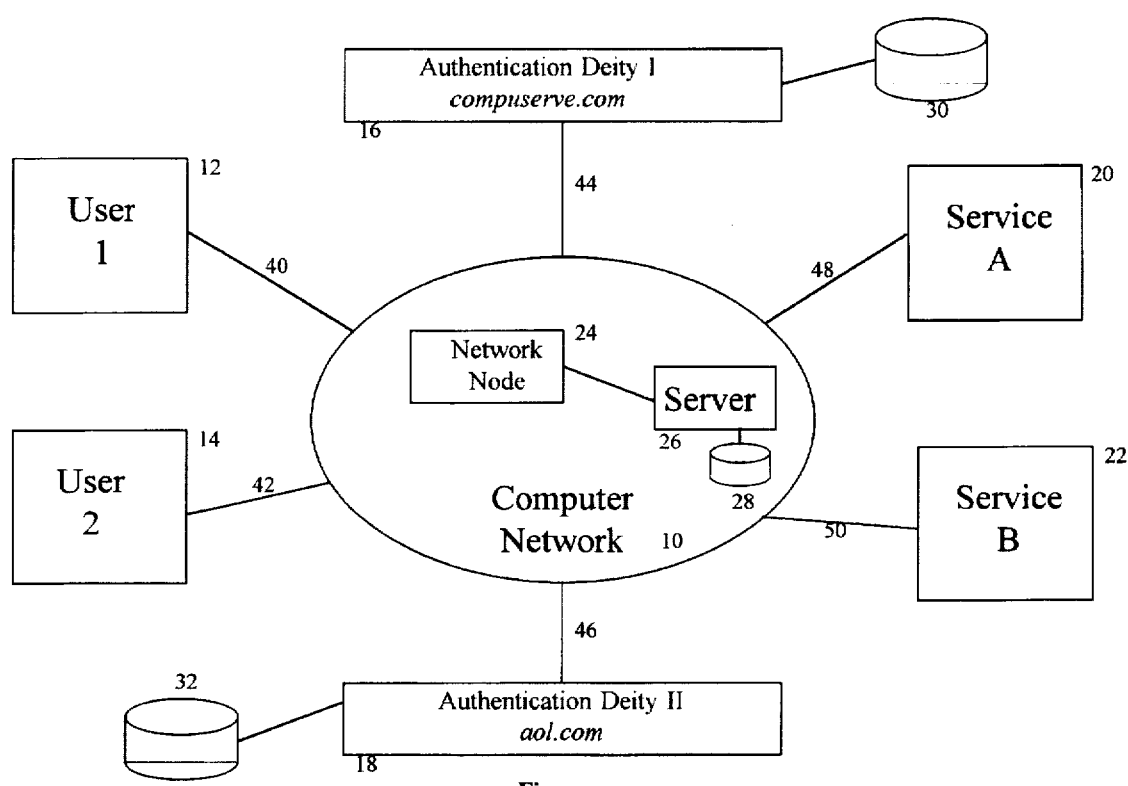
FIG. 1 is a system block diagram for a preferred embodiment of the present invention.

Referring to FIG. 1, a system block diagram for a preferred embodiment of the present invention is shown. Three entities or parties participate in the authentication process of the present invention:

the user 12, 14;

the service 20, 22; and the authentication deity 16, 18.

The entities communicate with one another via a global computer network 10 such as the Internet. In an alternative embodiment, the three participating entities may be part of a small, domestic computer network. The computer network 10, which uses a message passing scheme for communication between entities, may be comprised of network node computers 24 that route messages through the network to the communicating entities 12, 14, 16, 18, 20, 22. The network node computers may rely on servers 26 that access databases 28 to obtain routing and other information needed to facilitate network traffic.

To communicate with one another, each entity establishes a connection 40, 42, 44, 46, 48, 50 to the network 10. Network connection options for the entities are varied and may include a local area network (LAN) or the public telephone network via a modem or a dedicated line such as a X.25 link or a satellite or fiber optic link. Using addressing information provided by the users 12, 14 and services 20, 22, the network facilitates communications so that any one entity may communicate, either in real time or by leaving messages, with another entity on the network. For example, User 1 may communicate with Service A 20, Service B 22, or User 2 (14). Service B 22 may communicate with Service A 20 or with either User 12, 14. Although two users and two services are shown for simplicity, in reality, millions of users and services may communicate with one another through the computer network 10.

To use RPA, each user 12, 14 is assigned a user name and a pass-phrase in some realm of interest (e.g., compuserve.com or aol.com). Similarly, each service 20, 22 has a name and a pass-phrase for the realms that it supports. The pass-phrase is not text, but is instead a 128-bit (16-octet) string of bits. However, it is often useful to use pass-phrases in the conventional, textual sense, so a procedure is defined for converting a textual phrase to the 128-bit value used by the authentication mechanism of the present invention.

A service may support multiple realms, each of which has its own authentication deity 16, 18. By supporting multiple realm% a service may be able to increase its user base by making itself available to users who have a user name/pass-phrase in only one realm. User name/pass-phrase and service/pass-phrase pairs used by each authentication deity 20, 30 that supports a particular realm may be stored in a database 30, 32 for retrieval during the authentication process. The authentication deity with which a service communicates to complete the authentication process depends on the realms offered by the service and the realm selected by the user. The service then locates the authentication deity for the selected realm. If the service knows the user's pass-phrase, it performs the role of the authentication deity itself, but this does not affect the mechanism.

The following values are involved in the authentication process of the present invention.

| | |
|---|---|
| As: | Authentication deity's response to service; proves user's identity |
| Au: | Authentication deity's response to user; proves service's identity |
| Cs: | Challenge from service |
| Cu: | Challenge from user |
| Kus: | Session key for user and service |
| Kuss: | Session key obscured so visible only to service |
| Kusu: | Session key obscured so visible only to user |
| Nr: | Realm name |
| Ns: | Service name |
| Nu: | User name |
| Ps: | Service's pass-phrase, a 128 bit value |
| Pu: | User's pass-phrase, a 128 bit value |
| Rs: | Service's response to challenge (during authentication process, goes to authentication deity; during reauthentication, goes to user) |
| Ru: | User's response to challenge (during authentication process, goes via service to authentication deity; during reauthentication, goes to service) |
| Z: | Padding consisting of 48 octets (384 bits) with all bits set to zero |
| +: | Concatentation of octet strings |
| xor: | Bitwise "Exclusive Or" |

Preferably, bit patterns for each value are specified so that different implementations may be supported. For example, one implementation may use ASCII, another EBCDIC, and another Unicode for the user name. Another implementation may convert the user name to lowercase and another to all caps. The different implementations produce different results for the same calculation so the authentication may fail. The details may be left to underlying protocol, but that makes the service-to-deity protocol dependent on the user-to-service protocol. Using such a scheme makes it difficult to provide a single deity for each realm. By specifying the bit patterns, any mixture of user-to-service and service-to-deity protocols may be used to operate on the same data.

The following conventions facilitate the development of a single deity to support multiple realms. Preferably, text strings are represented in the Unicode character set, in big-endian byte order, without a trailing null character. Each 16-bit Unicode character may be stored in two octets, with its high-order 8 bits in the first octet. The specification refers only to values used in the authentication calculations, not the underlying protocol. For example, a protocol may use ASCII for user names, if that character set is adequate. The ASCII characters may be converted to Unicode before using them in authentication calculations, but the protocol need not transmit Unicode characters.

Names—Nr, Ns, Nu—are converted to lowercase Unicode.

Challenges—Cs, Cu—are arbitrary strings of octets, not text. They may contain any bit patterns, including nulls, and are preferably, at least eight octets in length.

Pass-phrases—Ps, Pu—are 16-octet quantities that contain arbitrary bit patterns, including nulls. If the pass-phrase is based on a textual phrase, the textual phrase is converted to a 16-octet quantity by the following process:

Convert the text string to a sequence of characters in either the Unicode or ISO 8859-1 character sets, as appropriate for the realm.

Convert each character to its lowercase equivalent, or its uppercase equivalent, or leave it alone, as appropriate for the realm.

Store the sequence of characters in an octet stream, with each Unicode character in two consecutive octets in big-endian order, or each ISO 8859-1 character in one octet.

Take the MD5 digest of the resulting string of octets. The result is the 128-bit value to use in the authentication calculations.

A realm specifies which of the preceding options—character set, case conversion, and hash function—it uses for the text-to-128-bit value transformation. Preferably, the defaults are Unicode, convert to lowercase, and MD5. The user-service protocol may be designed to convey the appropriate options for each realm from the service to the user, if other than the defaults are to be supported, to avoid requiring the (human) user to manually configure software.

Figure 2:
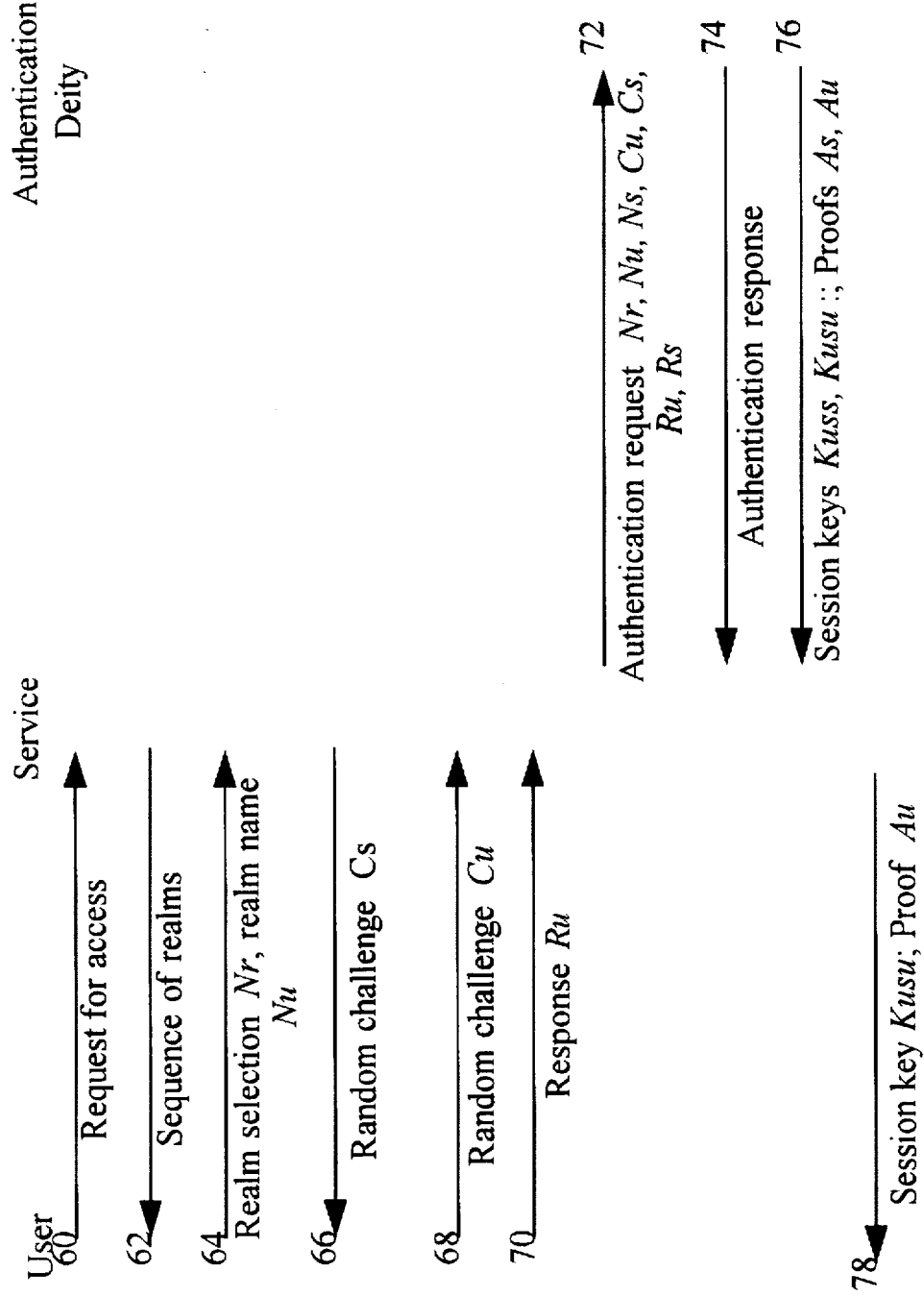
FIG. 2 illustrates an authentication protocol for a preferred embodiment of the present invention.
Figure 3:
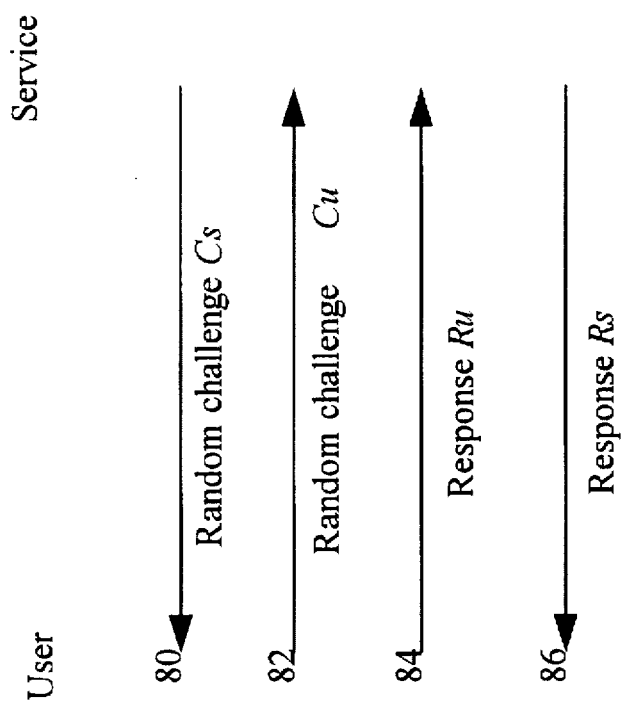
FIG. 3 illustrates a reauthentication protocol for a preferred embodiment of the present invention.

Referring to FIG. 2, the primary steps for a preferred embodiment of the present invention are shown.

The authentication process begins when a user attempts to access a service 60.

In response to the user's access attempt, the service supplies a sequence of realms, with the service's name in each realm, to the user 62. A user may choose a realm in which he has an identity. For example, a CIS user may choose to be authenticated in the CIS realm while an AOL user may choose to be authenticated in the AOL realm. [foo@compuserve.com bar@aol.com may mean "Please identify yourself with a CIS user ID. If you don't have one, your AOL ID will do."] Preferably, the service indicates its realm preferences in most-preferred to least-preferred order. By specifying only one realm, the service requires identification in that realm.

The user chooses a realm, Nr, and gives it and his name in that realm, Nu, to the service 64. That, in turn, determines Ns, the service's name in that realm. Note that a protocol may allow the service to include a null realm name, meaning "I'll accept you as an anonymous user if you wish." The user may make this choice by supplying a null name; then the process stops here, and no authentication is performed.

The service transits a random challenge, Cs 66. The challenges are random values that make each authentication unique.

The user sends a random challenge, Cu 68.

The user calculates a response, Ru:

Ru=MD5(Pu+Z+Nu+Ns+Nr+Cu+Cs+Pu)

The response is sent to the service 70. Only the real user may generate the correct response because it depends on the user's pass-phrase, Pu. Generally, user's pass-phrase may not be determined from a captured response because it's generated by a one-way function (although there is the risk of a dictionary attack if Pu is based on a poorly chosen pass-phrase.)

The service calculates a response, Rs:

Rs=MD5(Ps+Z+Nu+Ns+Nr+Cu+Cs+Ru+Ps)

This response is not sent to the user. It may be seen by the user, but the user does not need it.

The service sends a request to the authentication deity for the realm in question 72. The request contains the realm name, Nr (included so the same deity may serve more than one realm), the user's name, Nu, the service's name, Ns, the user's challenge, Cu, the service's challenge, Cs, the user's response, Ru, the service's response, Rs.

The deity uses Nr, Ns, and Nu to look up the user's and service's pass-phrases.

The deity uses the values in the request, plus the service's pass-phrase, Ps, to verify Rs. If it is incorrect, the deity returns a negative response as this request apparently did not come from a legitimate service 74.

Having verified the requesting service's identity, the deity uses the values in the request, plus the user's pass-phrase, Pu, to verify Ru. If it is incorrect, the deity returns a failure response to the service as the user does not know the correct pass-phrase 74.

Having verified both the user's and service's identity, the deity creates a random, 128-bit session key, Kus, for use by the user and service. They may use it for session encryption. In addition, it may be used in the reauthentication process described later.

The deity generates two obscured copies of the session key:
Kuss=Kus xor MD5(Ps+Z+Ns+Nu+Nr+Cs+Cu+Ps)
Kusu=Kus xor MD5(Pu+Z+Ns+Nu+Nr+Cs+Cu+Pu)
The obscuring masks resemble Ru and Rs, but differ so an eavesdropper may not recover Kus.

The deity generates a pair of authentication "proofs":
Au=MD5(Pu+Z+Ns+Nu+Nr+Kusu+Cs+Cu+Kus+Pu)
As=MD5(Ps+Z+Ns+Nu+Nr+Kuss+Cs+Cu+Kus+M+Ps)
Here "M" is the message transmitted from the deity to the service. It is included in the calculation to authenticate the response to the service.

The deity sends the four values Kuss, Kusu, As, and Au to the service.

The service extracts its copy of the session key from Kuss by calculating the obscuring mask value and XORing. (The service may determine the user's key-obscuring value by calculating Kus xor Kusu. If the user sees Kuss, it may do likewise. But the obscuring masks reveal nothing.)

The service verifies As by performing the same calculation and comparing the result. If it matches, the service knows that someone who knows its pass-phrase—the deity—replied, having verified that the user is who he claims to be.

The service forwards Kusu and Au to the user 78.

The user extracts its copy of the session key from Kusu by calculating the mask value and XORing.

The user verifies Au by computing it and comparing it to the service response Rs. If it matches, the user knows that someone who knows his pass-phrase—the deity—replied, having verified that the service is who it claims to be.

Now the user and service are confident of each others' identities, and the two parties share a session key that they may use for encryption, if they so choose.

Reauthentication

Reauthentication is a process by which a user and service, having recently authenticated each other, may again mutually authenticate without talking to a deity. This technique is useful for protocols such as HTTP which involve a sequence of connections that are independently authenticated. It is also useful with parallel connections—for example, in a scheme in which a user and service are connected and wish to establish a second connection.

To reauthenticate one another, the user and service prove to each other that they both possess a secret 128-bit key—the session key, Kus, derived during the authentication process. The reauthentication process is essentially an ordinary challenge-response mechanism in which the session key is used as a pass-phrase.

The service sends a challenge, Cs, to the user 80.

The user sends a challenge, Cu, to the service 82.

The user calculates Ru:
Ru=MD5(Kus+Z+Ns+Nu+Nr+Cs+Ca+Kus)
The response is sent to the service 84.

The service verifies the result, Ru. If correct, it calculates Rs:
Rs=MD5(Kus+Z+Nu+Ns+Nr+Cu+Cs+Kus)
The response is sent to the user 86. (Both responses involve the same set of values, but they are used in a different order, so the responses are different.)

The user verifies the result.

Reauthentication Cheating

In some protocols, it may be more efficient to shortcut the reauthentication process by cheating. One technique is to allow the Authorization header to be replayed (replay). For example, to embed a challenge-response technique in HTTP, two HTTP transactions may be used for authentication because a challenge may not be sent and a response received in one HTTP transaction. However, if the user may be challenged without sending a challenge to the user, authentication may be accomplished in one HTTP transaction. A single HTTP transaction may be used to accomplish authentication by treating the Uniform Resource Identifier (URI) as a challenge as follows:

The first time, the user and service perform the authentication process as described above.

The user and service remember the session key (Kus) and challenges (Cu and Cs).

When the user generates an HTTP request, he includes an Authorization header containing a response calculated as:
MD5(Kus+Z+Ns+Nu+Nr+Cs+Cu+method+URI+Kus)

The method and URI are canonicalized by taking the big-endian Unicode representation and converting all characters to lowercase. Preferably, the URI does not include the scheme://host:port. Preferably, it begins with a slash. For example, for http://www.foo.com, the one-character string "/" may be used.

Now the authentication response is unique for each URI, and calculable by the authenticated user, even without a unique challenge. This risk associated with replay is not eliminated completely, but an attacker may replay only a previously referenced URI during the window in which the service considers the session key to be valid. When reading Web pages, the only impact of replay is that the attacker may re-read the page. Such a risk may be acceptable because the attacker saw the page when it was captured it along with the original request.

In the event the user is charged per page or if the request "did" something, replays may be handled as follows. One strategy to address the problem is to maintain some history. In its simplest form, the service sets a flag for this session when it does something for which replay is not acceptable.

If the user tries reauthentication cheating, and the flag is set, the service forces reauthentication. Because the cheating response is based on Cu and Cs, and those values change during reauthentication, the correct response for a given URI changes after reauthentication. Thus, reauthentication creates a boundary after which previous requests may not be replayed.

Alternatively, the service may maintain a history of URIs for which replay may be inadequate. Using this scenario, reauthentication may be required only if the user tries reauthentication cheating on one of those URIs.

Service-to-Deity Protocol

The protocol used by the service and authentication deity in a preferred embodiment of the present invention may be summarized as follows. The service sends a request to the authentication deity and receives a reply. The requests and replies may be packaged in User Datagram Protocol (UDP) datagrams, or as byte streams over a Transport Control Protocol (TCP) connection.

Finding the deity is a service configuration issue that may be resolved in several different ways. Preferably, the service knows the IP addresses, TCP or UDP port numbers, etc., for the deities for a particular realm. Also, the service knows its name and pass-phrase in that realm.

Object Formats

In a preferred embodiment of the protocol of the present invention, every message is an object composed of other objects. Every object consists of a type-length-value encoded structure:

| Type | Length MSB | Length LSB | Value octet 1 |
|---|---|---|---|
| Value octet 2 | Value octet 3 | Value octet 4 | ... |

Each box represents one octet. Octets are transmitted in order from left to right, top to bottom.

"Type" is a single octet that identifies the type of the object.

"Length" indicates the number of octets following the length field, as a 16-bit, big-endian value. The appropriate number of value octets—possibly none—follow the length field. Their meaning is determined by the type of the object; in some cases, the value octets contain a sequence of other objects.

Here is an example of an object that contains 4 value octets:

| Type | 00000000 | 00000100 | Value octet 1 |
|---|---|---|---|
| Value octet 2 | Value octet 3 | Value octet 4 | |

Here is an example of an object that contains 1,000 value octets:

| Type | 00000011 | 11101000 | Value octet 1 |
|---|---|---|---|
| Value octet 2 | Value octet 3 | Value octet 4 | Value octet 5 |
| ... | | | |
| Value octet 996 | Value octet 997 | Value octet 998 | Value octet 999 |
| Value octet 1000 | | | |

Preferably, no padding or alignment is used. If an object contains sub-objects, they follow one another with no padding. For example, an object whose value consists of three sub-objects may be represented as follows:

| Object type | 00000000 | 00001111 | Sub-obj 1 type |
|---|---|---|---|
| 00000000 | 00000101 | Value octet 1 | Value octet 2 |
| Value octet 3 | Value octet 4 | Value octet 5 | Sub-obj 2 type |
| 00000000 | 00000000 | Sub-obj 3 type | 00000000 |
| 00000001 | Value octet 1 | | |

In this example, there is a single object whose value contains 15 octets. In this example, the value is a sequence of three objects; the first of which contains five octets, the second of which is zero length, and third of which contains one octet. The meaning of each object depends on its type.

The term "sub-object" may refer to an object when it is a part of another object, but this is merely a matter of terminology. There is no difference in encoding nor in the meaning of the type field, regardless of whether the object is contained in some other object or not.

The Deity Information Field

All messages may contain a field ("deity information field") that conveys information defined by a particular deity. The deity information field may be used in three contexts:

In a request, a service may use the deity information field to tell the deity the nature of the action for which authentication is being performed, if there is some reason to do so. In addition, the service may ask the deity for particular information about the user name being authenticated, although, in general, the deity already knows what additional information to return to a particular service.

In an affirmative response, the deity may return additional information about the user name.

In other responses, the deity information field may indicate something about the nature of the problem.

In general, different deities and services have different information appropriate for inclusion in the deity information field. It is difficult to conceive of a truly "standard" set of information to be included in the deity information field. Thus, the definition of the deity information field's contents is left to each deity.

Message Object Types

There are seven message object types, one for a request and six kinds of replies.

Authentication request
Authentication response, affirmative
Authentication response, no service
Authentication response, negative
Authentication response, invalid service
Authentication response, problem The various response flavors indicate various conditions of the account as described below. A message is an object that contains other objects. Preferably, the message itself is encoded as a type, length, and value, as described above, where the value consists of the concatenation of the component objects of that message. Each component object consists of its own type, length, and value. Unless stated to the contrary, all messages contain exactly the objects indicated in the order shown. Optional components, such as the deity information field, may be omitted.

Authentication Request

An authentication request contains the following sub-objects.

| Request identifier |
| --- |
| Nr (Realm name) |
| Ns (Service name) |
| Nu (User name) |
| Cu (Challenge from user) |
| Cs (Challenge from service) |
| Ru (Response from user) |
| Deity Information (optional) |
| Rs (Response from service) |

The request identifier contains arbitrary data that is not interpreted by the deity. It is echoed in a response to provide a way for the requesting service to match requests and responses. The deity information field contains additional information about the request, and is described below. Usually, it is omitted or null, (i.e., zero-length.)

Rs is calculated as MD5(Ps+Z+M+Ps), where M is the request shown above, octet by octet, from the type octet for the message object itself through the last length octet of the length field of the Rs object. Thus, it serves to protect the entire request, including its structure, length, etc.

Authentication Response, Affirmative

An affirmative response indicates that the user name is recognized, and is indeed the user the service is talking to.

| Request identifier |
| --- |
| Canonical Nu (User name, case corrected) |
| Kuss (Key obscured for service) |
| Kusu (Key obscured for user) |
| Deity Information Field (optional) |
| As(Authentication value for service) |

Preferably, the response contains the canonical user name in the desired case and is not the same object type as Nu in the request. In an environment that is not case sensitive, this is the preferred form of the name, which may differ from the name in the request. The deity information field may contain additional information about the user name.

As is calculated as:

MD5(Ps+Z+Ns+Nu+Nr+Kuss+Cs+Cu+Kus+M+Ps)

where M is the request shown above, octet by octet, from the type octet for the containing object through the last octet of the length field of the As object, inclusive. This serves to protect the entire request. Note that the Nu mentioned as the third component in the formula is the originally specified user name, not the altered-case version in the response message. An affirmative response does not necessarily mean that it is reasonable to provide service to the user. Often, there are criteria beyond a "yes" answer, that could mean anything from "it's a valid user" to "it's a valid user, but not billable" to "it is an account that was signed up five minutes ago and we haven't had a chance to look at it yet."

Typically, the authentication deity applies criteria appropriate to the requesting service. For example, if the service does not want to allow "free" users, the authentication deity may be configured to return a no-service response for such a user. Alternatively, the deity may be configured to provide an affirmative response, but include information in the deity information field that permits the service to distinguish "free" from "paying" users and treat them differently.

Authentication Response, No Service

The no-service response is an indication that the user is whom she claims to be, but she is not entitled to access the service for one reason or another. For example, she may be a "free" user, but the service is provided only to paying accounts, or her billing choices may not include the service, or Customer Service may be waiting for her to provide a new credit card number. The authentication deity's configuration for this particular service determines the criteria applied by the deity when making the decision to reply affirmative or no service.

| Request identifier |
| --- |
| Canonical Nu (User name, case corrected) |
| Kuss (Key obscured for service) |
| Kusu (Key obscured for user) |
| Au (Authentication value for user) |
| Deity Information Field (optional) |
| As (Authentication value for service) |

The contents of this object are identical to those for an affirmative response, but the service does not normally use the keys or Au values. The deity information field may include information useful in distinguishing the reason for the no service response, if appropriate for this service.

Authentication Response, Negative

A negative response means the user is not who she says she is. This response may result for several reasons. First, there may be such a user name, but the service is not communicating with the actual user. Also, there may be such a user name, but it is not an enabled account. Alternatively, there may be no such user name.

| Request identifier |
| --- |
| Deity Information Field (optional) |
| As (Authentication value for service) |

As is calculated as MD5(Ps+Z+M+Ps). The message may contain a deity information field if there is additional information about the problem (e.g., for logging), but it may be omitted.

Authentication Response, Invalid Service

An invalid request response means the request may not be processed because the service is not what it claims to be as, apparently, the service's pass-phrase is not known. The negative response may also be based on any other kind of authentication checking done by the deity.

| Request identifier |
| --- |
| Deity Information Field (optional) |

The deity information field, if present, contains information that allows the deity administrators to trace the problem. There is no As field because there is no shared secret to authenticate the response.

Authentication Response, Problem

A "problem" response indicates that the request may not be processed for some reason. There may be a failure in the system, an unparsable request, or a request for a realm that is not handled by this deity. Other problems may also result in this response.

| Request identifier |
|---|
| Deity Information Field (optional) |
| As (optional) |

The Deity Information Field may contain information that allows the deity administrators to trace the problem. As may or may not be present, depending on the nature of the problem (i.e., whether there is a known shared secret with the server), if present, it is calculated as MD5(Ps+Z+M+Ps)

Object Types

The following types of objects may be defined in this protocol. These object types apply to the messages themselves and objects contained in messages. These types do not apply to the contents of the deity information field.

Authentication request—type 1—The request to the authentication deity. Its contents consist of a sequence of other objects as described elsewhere.

Authentication response, affirmative—type 2
Authentication response, no service—type 3
Authentication response, negative—type 4
Authentication response, invalid service—type 5
Authentication response, problem—type 6

Request identifier—type 128—A request contains an identifier to assist in matching replies to requests. This identifier is opaque to the deity and is simply echoed in the reply so its value is defined only by the requesting entity. Preferably, the value is unique for each request, but it is otherwise meaningless. It may be of any length.

Realm name—type 129—The name of the realm in which the user's and service's identities exist. This value is included in the request to allow a deity to serve more than one realm. Preferably, the value consists of the name in Unicode, in big-endian order. There is no terminating null character, and the realm is generally treated as being case insensitive. For example, the realm aol.com may appear as follows:

| 10000001 | 00000000 | 00001110 | 00000000 |
|---|---|---|---|
| 01100001 | 00000000 | 01101111 | 00000000 |
| 01101100 | 00000000 | 00101110 | 00000000 |
| 01100011 | 00000000 | 01101111 | 00000000 |
| 01101101 | | | |

The type is 129, fourteen octets follow, and the big-endian Unicode representation of the seven characters "aol.com".

Service name—type 130—The name of the service in big-endian Unicode.

User name—type 131—The name of the user in big-endian Unicode, (e.g., gsb.)

User challenge—type 132—The user's challenge, a sequence of random octets. The length is not bounded by the protocol, but the deity may impose length restrictions, (e.g., a minimum and maximum length.) All bit patterns are permitted in the challenge.

Service challenge—type 133—The service's challenge, a sequence of random octets. The length is not bounded by the protocol, but the deity may impose length restrictions, (e.g., a minimum and maximum length.) All bit patterns are permitted in the challenge.

User's response—type 135—The user's response, containing 16 octets with the value specified above. This value is binary so any bit pattern may be used.

Service's response—type 136—The service's response, calculated as described above. This value is binary so any bit pattern may be used.

Key obscured for user—type 137—The key for the user, containing 16 octets as described in above. This value is binary so any bit pattern may be used.

Key obscured for service—type 138—The key for the service, containing 16 octets as described above. This value is binary so any bit pattern may be used.

Authentication proof for user—type 139—The authentication proof, Au, for the user, containing 16 octets as described above. This value is binary so any bit pattern may be used.

Authentication proof for service—type 140—The authentication proof, As, for the service, containing 16 octets calculated as described above. This value is binary so any bit pattern may be used.

Canonical user name—type 141—The user name adjusted to canonical case, in big-endian Unicode.

Deity Information Field—type 142—Deity—specific request and response information. It may include a sequence of objects that contain information about the user's account, or indicate, by their presence or absence, some characteristic of the user's account. The use of any particular object is a function of the deity's configuration for a particular service. Consider, for example, a "free" account in an environment where services are normally provided for a price. There are three most-likely possibilities for how the deity may handle a free account when a particular service asks the deity to authenticate a user:

If the account is free, return an affirmative response.
If the account is free, return an affirmative response and include a "free" indicator in the deity information field.
If the account is free, return a no-service response.

The first alternative may be appropriate for a service that provides service to free users, when the service is not concerned whether the user is paying or not. The second alternative may be appropriate for a service that provides service to free users and handles free and paying users differently (e.g., provides a different class of service to free users than not-free users.) The third alternative may be appropriate for a service that does not provide service to free users. In that case, the deity may include a free indicator in the deity information field, to note the reason.

Services may use the deity information field differently depending on the needs of the service. Therefore, the deity information field format, preferably, is flexible to accommodate the different ways in which services may use the field. A service-deity pair may define the deity information field in accordance with the type of information to be exchanged. Preferably, one type of sub-object that contains textual attribute/value pairs is defined to provide a standard encoding for one common need.

Type 1—Attribute/value pairs—If the deity information field contains a type-1 object, that object may be composed of a sequence of textual attribute/value pairs, where the value is optional. Sometimes, the presence or absence of an attribute is significant, with no need for a corresponding value. An attribute consists of a sequence of Unicode characters in the syntax attribute ["=" value] (i.e., the attribute name optionally followed by an '=' character (code 003D) and a value.) All characters may be taken from the Unicode character set and stored in big-endian byte order. The attribute name may consist of any characters except a null or equal sign. The value may consist of any characters except a null.

HyperText Transfer Protocol Embodiment

In one embodiment of the present invention, the mechanism of RPA is adapted to work with the Hyper-Text Transfer Protocol (HTTP) of the WWW/Internet. The HTTP client may indicate that it supports this authentication mechanism by whatever technique is appropriate. For example, when requesting access to a service, the client may include a header such as "Extension: Security/Remote-Passphrase" to indicate its ability to perform this authentication mechanism. The extension mechanism is independent of the authentication mechanism.

Next, a security context may be defined which represents a logical connection between a user (client) and Web server. Preferably, because the context spans HTTP connections, the server assigns a security context identifier—an opaque string—when it creates a context. The server assigns an identifier when it creates a context and it informs the client of its value in the Security-Context attribute of the WWW-Authenticate header. The client includes the identifier in the Authorization header of subsequent requests that refer to the same context.

From the client's point of view, the pair (server IP address, security context identifier) uniquely identifies a context. The same is essentially true for the server, although a server may make its security context identifiers unique, rather than (client IP address, identifier) pairs.

A client may refer to the same security context from different IP addresses, if he switches proxies. The client IP address alone may not be adequate to identify the security context. A multiple-user host, an HTTP proxy, and a SOCKS server are examples of situations in which the same IP address may be involved in many security contexts. Even an individual PC running two browsers falls into this category—if the user connects to a server from both browsers, two security contexts are established that may or may not refer to the same user identity.

The security context "contains" information appropriate to the context, such as the realm name, user and service names, session key, challenges, state, etc. Authentication schemes to be included in the headers may also be defined. The client begins by making a request for which the server requires identification and authentication. If there is no Authorization header in the request, the server requests authentication. All WWW-Authenticate and Authorization headers used with this scheme may include a Version attribute to identify the version of the protocol in use. When omitted, as in the examples below, Version="1" may be implied, for this version of the protocol.

Authentication

The server creates a new security context, assigns it an identifier, and responds 401 Unauthorized and includes the header:

---
WWW-Authenticate:

Remote-Passphrase
Realm="compuserv.com",
State="Initial",
Realms="authen@compuserve.com
  verify@aol.com:iso-8859-1,lc,md5",
Challenge="base64 encoding of service challenge",
Security-Context="opaque"

---

The first token specifies the authentication scheme, Remote-Passphrase. Following is a comma-separated list of attribute-value pairs. In HTTP, the first attribute is called "Realm" and specifies the realm in which the user, preferably, indicates his identity. However, RPA supports multiple realms so this is merely one realm acceptable to the server—perhaps its preferred realm. The State attribute may distinguish this as the initial request for authentication.

The Realms attribute may provide a list of realms in the order preferred by the server, with the server's name in each realm. Each may be followed by a colon and a list of parameters separated by commas to drive the transformation from pass-phrase to 128-bit shared secret for that particular realm. The default transformation, if the colon and parameters are omitted, is the Unicode character set in big-endian ("network") byte order with all characters convened to lowercase and the MD5 hash algorithm.

Preferably, a single parameter, "none", is used to imply that the client already possesses a 128-bit value and no transformation from a textual pass-phrase is defined. Otherwise, three parameters may control the transformation from a textual pass-phrase to the 128-bit shared secret used by the authentication mechanism, if such a transformation takes place. The three parameters specify the character set: Unicode 1.1 ("unicode-1-1") or ISO 8859-1 ("iso-8859-1"); case conversion: convert to all caps ("uc"), all lowercase ("lc"), or as-is with no case conversion ("nc"); and hash function: MD5 ("md5"). Omitting the colon and parameters is equivalent to specifying "unicode-1-1,lc,md5". These parameters are part of the base authentication mechanism specification. Only the means of conveying them, and the textual names shown above, are specific to this HTTP authentication scheme. Other variations may be added, but preferably, they are added to the base authentication mechanism.

The Challenge attribute specifies the service's challenge. It is an arbitrarily long sequence of octets containing arbitrary bit patterns, represented in base64. The client decodes it before using it in the authentication calculations. It may contain nulls or any other bit patterns. The client may decline to trust the server and abort at this point, if it deems the challenge to be too short.

The Security-Context attribute contains the server-assigned security context identifier—an opaque string. The client creates its security context and repeats the request with an Authorization header:

---
Authorization:

Remote-Passphrase
State="Initial",
Security-Context="opaque",
Realm="compuserve.com",
User name="70003.1215",
Challenge="base64 encoding of user challenge",
Response="base64 encoding of response"

---

The first token specifies the authorization scheme. It is followed by the state, "Initial" for the initial authentication; the security context identifier; the realm chosen by the user; the user's identity in that realm; the user's challenge; and the user's response. The service looks up the security context. If the security context identifier refers to no context or refers to a context that is already established, the server creates a new security context with a new identifier, then responds 401 Unauthorized and includes a fresh WWW-Authenticate header, as shown above, with which the client may repeat the request with correct authentication information.

Any existing security context is unaffected. If the context identifier is recognized and that context is in the awaiting authentication state, the server performs the authentication process. The server may verify that the client's IP address matches that in the previous request that created the "pending" context.

If the authentication process fails, preferably, the server refuses to process the request, but does not delete the "pending" security context. It generates a 401 Unauthorized response with a WWW-Authenticate header that indicates failure:

| WWW-Authenticate: |
| --- |
| Remote-Passphrase<br>Realm="nonsense",<br>State="Failed" |

It is up to the client to try the request again (without an Authorization header), restarting the entire process, if it believes that it was using the wrong pass-phrase but, it now has the right pass-phrase.

Otherwise, having successfully authenticated the user, the server processes the client's request and returns an appropriate response, including in its reply the following:

| WWW-Authenticate: |
| --- |
| Remote-Passphrase<br>Realm="realm in use",<br>State="Authenticated",<br>Session-Key="base64 encoding of session key",<br>Response="base64 encoding of response" |

The "Authenticated" state indicates that the user was successfully authenticated, and includes the session key which is masked so only the user may extract it (Kusu), and the authentication deity's proof of the service's identity (Au, not Rs). The realm may be ignored, but preferably indicates the realm in which the identity was authenticated.

Reauthentication Cheating

Reauthentication cheating is a further optimization for an embodiment of the present invention compatible with HTTP. In general, the HTTP protocol is quite unfriendly to challenge-response mechanisms. However, the reauthentication cheating technique of the present invention may be performed in parallel with an HTTP transaction. The "one-way" handshake of reauthentication cheating is preferable to the true reauthentication which is just as simple, but involves two sequential requests because of the characteristics of HTTP.

In subsequent requests, the client tries to cheat by including an Authorization header in its request:

| Authorization: |
| --- |
| Remote-Passphrase<br>State="Cheating",<br>Security-Context="opaque",<br>Response="base64 encoding of response" | where the response is calculated based on the previously agreed-upon values plus the canonicalized method and URI of this request.

The HTTP specification suggests that clients be allowed to replay the previous Authorization header, but it includes an escape clause—"for a period of time determined by the authentication scheme"—so that period of time may be declared to be zero. If the server is willing to accept the use of reauthentication cheating, and the response is correct, the server may process the request without comment. If it recognizes the security context but, is not willing to cheat (e.g., it recognizes a replay) the server may demand reauthentication. If it does not recognize the security context or if it recognizes the context but, the client's response is incorrect, the server requests authentication but, does not delete the existing security context. In either of these cases, the server responds 401 Unauthorized and includes the appropriate WWW-Authenticate header.

Reauthentication

If the server chooses to require reauthentication, it replies 401 Unauthorized and includes the header:

| WWW-Authenticate: |
| --- |
| Remote-Passphrase<br>Realm="realm in use",<br>State ="Reauthenticate",<br>Challenge="base64 encoding of service challenge" |

The client retries the request with an Authorization field:

| Authorization: |
| --- |
| Remote-Passphrase<br>State="Reauthenticate",<br>Security-Context="opaque",<br>Challenge="base64 encoding of user challenge",<br>Response="base64 encoding of response" |

If the response is correct—the user has proven his knowledge of the previously generated Kus for this context—the server processes the request and includes in its reply:

| WWW-Authenticate: |
| --- |
| Remote-Passphrase<br>Realm="realm in use",<br>State ="Reauthenticate",<br>Response="base64 encoding of response" |

The past-tense state indicates successful reauthentication and includes the server's response. This response is of debatable relevance to HTTP given that the client's use of reauthentication cheating implies its willingness to trust that the server's identity has not changed.

If the client's response is incorrect, the server does not process the request. However, there is a possibility that the client attempted to do reauthentication with an old security context identifier that has been reused by the server. Although the server preferably avoids reusing security context identifiers, it may attempt to avert the problem by forcing authentication by responding 401 Unauthorized and including the header described above under Authentication.

SUMMARY

The need for secure communications is growing as the use of global computer networks increases. Users and services want assurance that they are communicating with the desired entity. Users and services have a need to learn and authenticate each other's identity. Consequently, there is a need for an authentication mechanism that provides a high level of security and is adaptable and flexible enough for use with many different protocols used by communicating entities on global computer networks. The authentication mechanism of the present invention meets these criteria and others including:

The service learns and authenticates the user's identity.

The user learns and authenticates the service's identity.

The mechanism is based on shared secrets: "pass-phrases" although they can be arbitrary bit patterns rather than text. It relies on the knowledge of the user rather than the user's location, point of access, access device, etc.

Neither the user nor the service nor eavesdroppers will learn the other's pass-phrase so neither the user nor the service will acquire the ability to impersonate the other.

The mechanism derives a shared secret that may be used as a session key for subsequent authentication.

The mechanism is easy to implement in clients and does not require the client to communicate with a third party (e.g., authentication deity).

The mechanism may be incorporated into almost any protocol. The mechanism is not designed around a protocol; the protocol is designed around the mechanism. It is suitable for incorporation into protocols such as HTTP.

The mechanism provides the ability to accept an identity in any of a set of realms in which the user and service are members. Users may be authenticated in a familiar realm. They are not required to remember a separate pass phrase for every service nor are they required to use a different authentication mechanism for every service they want to access.

The mechanism of the present invention works even if the service does not know the user's pass-phrase. In a distributed environment with many services that wish to authenticate the same set of users, it may be difficult, and undesirable, to make users' pass-phrases available to all services. Therefore, the service does not know the user's pass-phrase and it does not learn the user's pass-phrase during the authentication process.

The mechanism of the present invention may be used in the traditional case where the service knows the user's pass-phrase. There is no need to use a different mechanism in that case.

Increasingly, businesses and other private and commercial entities wish to make their services and resources available to computer users throughout the world. In many instances, these entities would like to make their services and resources available through the WWW/Internet or other existing world-wide network so that they may be located easily and once located, may be accessed easily. However, users and services will be reluctant to communicate with one another unless each knows who or what is at the end of the connection. Remote Passphrase Authentication provides users and services with confidence regarding each other's identity that is needed to engage in on-line business and related transactions.

What is claimed is:

1. A method of authentication, said method comprising the steps of:
   (a) assigning a first identifier and a first pass-phrase to a first entity, said first identifier and said first pass-phrase associated with a realm;
   (b) assigning a second identifier and a second pass-phrase to a second entity, said second identifier and said second pass-phrase associated with said realm;
   (c) storing said first identifier, said first pass-phrase, said second identifier, and said second pass-phrase at an authentication entity;
   (d) requesting access to said second entity, said request initiated by said first entity and including said first identifier;
   (e) transmitting a first challenge from said second entity to said first entity;
   (f) transmitting a second challenge from said first entity to said second entity;
   (g) calculating a first response involving said realm, first identifier, said first pass-phrase, said first challenge, said second identifier, and said second challenge, said first response calculated by said first entity;
   (h) calculating a second response involving said realm, said second identifier, said second pass-phrase, said second challenge, said first identifier, and said first challenge, said second response calculated by said second entity;
   (i) transmitting said first response to said second entity;
   (j) transmitting said realm, said first identifier, said first challenge, said first response, said second identifier, said second challenge, and said second response to said authentication entity;
   (k) verifying said first response, said verification involving said realm, said first identifier, said first pass-phrase, said first challenge, said first response, said second identifier, and said second challenge, and said verification performed by said authentication entity;
   (l) verifying said second response, said verification involving said realm, said first identifier, said first challenge, said second identifier, said second pass-phrase, and said second challenge, and said verification performed by said authentication entity;
   (m) generating a first authentication proof for said first entity, said first authentication proof generated by said authentication entity and involving said realm, said first identifier, said first pass-phrase, said first challenge, said second identifier, and said second challenge;
   (n) generating a second authentication proof for said second entity, said second authentication proof generated by said authentication entity and involving said realm, said first identifier, said first challenge, said second identifier, said second pass-phrase, and said second challenge;
   (o) transmitting said first authentication proof and said second authentication proof from said authentication entity to said second entity; and
   (p) verifying said second authentication proof, said verification performed by said second entity;
   (q) transmitting said first authentication proof from said second entity to said first entity; and
   (r) verifying said first authentication proof, said verification performed by said first entity.

2. The method of claim 1, wherein said first entity is a computer user and said second entity is an on-line service.

3. The method of claim 2, wherein said on-line service is available via the World Wide Web.

4. The method of claim 2, wherein communications with the on-line service are via the HyperText Transfer Protocol.

5. The method of claim 1, further comprising the steps of generating a session key for said first entity and said second entity, said session key generated by said authentication entity.

6. The method of claim 5, wherein said first authentication proof and said second authentication proof includes said session key.

7. The method of claim 1, further comprising the step of transmitting an authorization response for said first response from said authentication entity to said second entity.

8. The method of claim 1, further comprising the step of transmitting an authorization response for said second response from said authentication entity to said second entity.

9. The method of claim 1, wherein said first response is calculated by application of the MD5 function to said first pass-phrase, said first identifier, said second identifier, said realm, said first challenge, and said second challenge.

10. The method of claim 1, wherein said second response is calculated by application of the MD5 function to said second pass-phrase, said second identifier, said first identifier, said realm, said first challenge, and said second challenge.

11. A method of authentication, said method comprising the steps of:
 (a) assigning a first identifier and a first pass-phrase to a first entity, said first identifier and said first pass-phrase associated with a realm;
 (b) assigning a second identifier and a second pass-phrase to a second entity, said second identifier and said second pass-phrase associated with said realm;
 (c) storing said first identifier, said first pass-phrase, said second identifier, and said second pass-phrase at an authentication entity;
 (d) requesting access to said second entity, said access request initiated by said first entity and including said first identifier;
 (e) transmitting a first challenge from said second entity to said first entity;
 (f) transmitting a second challenge from said first entity to said second entity;
 (g) calculating a first response involving said realm, said first identifier, said first pass-phrase, said first challenge, said second identifier, and said second challenge, said first response calculated by said first entity;
 (h) calculating a second response involving said realm, said second identifier, said second pass-phrase, said second challenge, said first identifier, and said first challenge, said second response calculated by said second entity;
 (i) transmitting said first response to said second entity;
 (j) transmitting said realm, said first identifier, said first challenge, said first response, said second identifier, said second challenge, and said second response to said authentication entity;
 (k) verifying said first response, said verification involving said realm, said first identifier, said first pass-phrase, said first challenge, said first response, said second identifier, and said second challenge, and said verification performed by said authentication entity;
 (l) verifying said second response, said verification involving said realm, said first identifier, said first challenge, said second identifier, said second pass-phrase, and said second challenge, and said verification performed by said authentication entity;
 (m) generating a session key for said first entity and said second entity, said session key generated by said authentication entity;
 (n) obscuring said session key for said first entity, said obscuring involving said realm, said first identifier, said first pass-phrase, said first challenge, said second identifier, and said second challenge, and performed by said authentication entity;
 (o) obscuring said session key for said second entity, said obscuring involving said realm, said first identifier, said first challenge, said second identifier, said second pass-phrase, and said second challenge, and performed by said authentication entity;
 (p) generating a first authentication proof for said first entity, said first authentication proof generated by said authentication entity and involving said realm, said first identifier, said first pass-phrase, said first challenge, said second identifier, said second challenge, and said obscured session key for said first entity;
 (q) generating a second authentication proof for said second entity, said second authentication proof generated by said authentication entity and involving said realm, said first identifier, said first challenge, said second identifier, said second pass-phrase, said second challenge, and said obscured session key for said second entity;
 (r) transmitting said first authentication proof and said second authentication proof from said authentication entity to said second entity; and
 (s) verifying said second authentication proof, said verification performed by said second entity;
 (t) transmitting said first authentication proof from said second entity to said first entity; and
 (u) verifying said first authentication proof, said verification performed by said first entity.

12. The method of claim 11, further comprising the steps of:
 (a) transmitting a third challenge from said second entity to said first entity;
 (b) transmitting a fourth challenge from said first entity to said second entity;
 (c) calculating a third response involving said realm, said first session key, said first identifier, and said second identifier, said response calculated by said first entity;
 (d) transmitting said third response from said first entity to said second entity;
 (e) verifying said third response; said verification performed by said second entity;
 (f) calculating a fourth response involving said realm, said second session key, said first identifier, and said second identifier, said fourth response calculated by said second entity;
 (g) transmitting said fourth response from said second entity to said first entity;
 (h) verifying said fourth response, said verification performed by said first entity.

13. The method of claim 12, further comprising the step of repeating steps (a)–(h).

14. The method of claim 11, wherein said access request is a HyperText Transfer Protocol request.

15. The method of claim 14, wherein said HyperText Transfer Protocol request includes an authorization header with a response involving said first session key, said realm, said first identifier, said second identifier, said first challenge, said second challenge, and a Uniform Resource Identifier.

16. A system for authentication comprising:
 a first entity;
 a second entity;
 an authentication entity;
 a first identifier and a first pass-phrase for said first entity, said first identifier and said first pass-phrase associated with a realm;
 a second identifier and a second pass-phrase for said second entity, said second identifier and said second pass-phrase associated with said realm;
 means for said authentication entity to retrieve according to said realm said first identifier, said first pass-phrase, said second identifier, and said second pass-phrase;

means for said second entity to transmit a first challenge to said first entity;

means for said first entity to transmit a second challenge to said second entity;

means for said first entity to calculate a first response involving said realm, said first identifier, said first pass-phrase, said first challenge, said second identifier, and said second challenge;

means for said second entity to calcite a second response involving said realm, said second identifier, said second pass-phrase, said second challenge, said first identifier, and said first challenge;

means for transmitting said realm; said first identifier, said first challenge, said first response, said second identifier, said second challenge, and said second response to said authentication entity;

means for said authentication entity to verify said first response, said verification involving said realms said first identifier, said first challenge, said second identifier, and said second challenge;

means for said authentication entity to verify said second response, said verification involving said realms said first identifier, said first challenge, said first response, said second identifier, and said second challenge;

means for said authentication entity to generate a first authentication proof for said first entity;

means for said authentication entity to generate a second authentication proof for said second entity;

means for transmitting said first and said second authentication proofs from said authentication entity to said second entity;

means for said second entity to verify said second authentication proof;

means for transmitting said first authentication proof from said second entity to said first entity; and means for said first entity to verify said first authentication proof.

17. The system of claim 16, wherein said first entity is a computer user and said second entity is an on-line service.

18. The system of claim 16, wherein said first response is calculated by application of the MD5 function to said first pass-phrase, said first identifier, said second identifier, said realm, said first challenge, and said second challenge.

19. The system of claim 16, wherein said second response is calculated by application of the MD5 function to said second pass-phrase, said second identifier, said first identifier, said realm, said first challenge, and said second challenge.

20. A system for authentication comprising:

a realm identifier associated with a first identifier and a first pass-phrase for a first entity;

a second identifier and a second pass-phrase for a second entity, said second identifier and said second pass-phrase associated with said realm;

means for authenticating said first entity, said means including said realm identifier; and means for authenticating said second entity, said means including said realm identifier.

21. The system of claim 20 wherein said first entity authentication means and said second entity authentication means includes authentication proofs for said first entity and said second entity, said authentication proofs including said realm identifier.

22. A method of authentication for use with Hyper-Text Transfer Protocol, said method comprising the steps of:

transmitting a connection request from a client to a server;

creating a server security context and assigning an identifier to said server security context, said server security context created by and said identifier assigned by said server in response to said connection request from said client;

transmitting a first authentication header from said server to said client, said first authorization header comprising a realm list, a status indicator, a service challenge, and said service security context;

creating a client security context and assigning said identifier to said client security context, said client security context created by said client;

transmitting an authorization header from said client to said server, said authorization header comprising a status indicator, said client security context, a realm selected from said realm list, a client identifier in said selected realm, a client challenge, and a client response to said service challenge;

examining said client security context to determine an authentication state for said client security context, said examination performed by said server; and performing authentication if said client context identifier is recognized by said server, said authentication performed by said server.

23. The method of claim 22 further comprising the step of transmitting from said server to said client a second authentication header including a status indicator indicating said client was successfully authenticated and a session key.

24. The method of claim 22 wherein said server security context identifier and said client security context identifiers are opaque strings.

25. The method of claim 22 wherein said server security context comprises a realm name, a server identifier, a session key, a server challenge, and a status indicator.

26. The method of claim 22 wherein said client security context comprises a realm, a client identifier, a session key, a client challenge, and a status indicator.

* * * * *

UNITED STATES PATENT AND TRADEMARK OFFICE
CERTIFICATE OF CORRECTION

PATENT NO. : 5,740,361
DATED : April 14, 1998
INVENTOR(S) : Gary S. Brown

It is certified that error appears in the above-indentified patent and that said Letters Patent is hereby corrected as shown below:

In column 1, line 18, please delete the word "amber" and replace it with -- number --.

In column 3, line 19, please delete the word "spooler" and replace it with -- spoofer --.

In column 5, line 27, please delete the word "convening" and replace it with -- converting --.

In column 6, line 64, please delete the word "realm%" and replace it with -- realms, --.

In column 10, line 16, please delete "Ca" and replace it with -- Cu --.

In column 18, line 11, please delete the word "convened" and replace it with -- converted --.

In column 25, line 9, please delete the word "calcite" and replace it with -- calculate --.

Signed and Sealed this

Eighteenth Day of August, 1998

Attest:

BRUCE LEHMAN

*Attesting Officer*     *Commissioner of Patents and Trademarks*